United States Patent [19]
Bangs et al.

[11] Patent Number: 5,802,380
[45] Date of Patent: Sep. 1, 1998

[54] METHOD AND SYSTEM FOR UNIFORM ACCESS OF TEXTUAL DATA

[75] Inventors: David L. Bangs, Kirkland; Alexander G. Gounares, Redmond; James J. O'Neill, Issaquah; Murray Sargent, III, Kirkland; Igor Y. Zaika, Seattle, all of Wash.

[73] Assignee: Microsoft Corporation, Redmond, Wash.

[21] Appl. No.: 653,281

[22] Filed: May 24, 1996

Related U.S. Application Data

[63] Continuation of Ser. No. 612,654, Mar. 8, 1996, abandoned.

[51] Int. Cl.$^6$ ........................................... G06F 17/22
[52] U.S. Cl. ........................... 395/777; 395/178; 395/682
[58] Field of Search ........................... 395/761, 777, 395/778, 680–685, 793, 791, 701–705, 774, 802

[56] References Cited

U.S. PATENT DOCUMENTS

| | | | |
|---|---|---|---|
| 4,723,210 | 2/1988 | Barker et al. | 395/776 |
| 4,723,211 | 2/1988 | Barker et al. | 395/776 |
| 4,823,209 | 4/1989 | Hernandez et al. | 395/783 |
| 5,530,794 | 6/1996 | Luebbert | 395/786 |
| 5,537,526 | 7/1996 | Anderson et al. | 395/777 |
| 5,581,760 | 12/1996 | Atkinson et al. | 395/702 |
| 5,638,504 | 6/1997 | Scott et al. | 395/761 |

OTHER PUBLICATIONS

Kenworthy, "The dynamic duo", Windows Magazine, v7 n11, pp. 301–302, Nov. 1996.

*Microsoft® Word for Windows™ Word Processing Program Version 2.0 User's Guide*, Microsoft Corporation, 1991–1992, Chapter 40, "Bookmarks and Cross–references," pp. 741–745.

*Microsoft Word for Windows 95, Version 7.0*, Microsoft Corporation, 1983–1985, Help Topics, "Copy Character and Paragraph Formats" and Fast formatting Techniques, 2 screenprints.

*Primary Examiner*—Joseph H. Feild
*Attorney, Agent, or Firm*—Jones & Askew, LLP

[57] ABSTRACT

A method and system through which an application program can access textual data through a common text accessing interface. The system provides a hierarchy of interfaces through which various text manipulation functions can be accessed. These functions control the editing and displaying of text. The hierarchy of interfaces include an interface for manipulating a document and for manipulating a range of characters within the document. By using these interfaces, a server can expose its text to various clients.

23 Claims, 8 Drawing Sheets

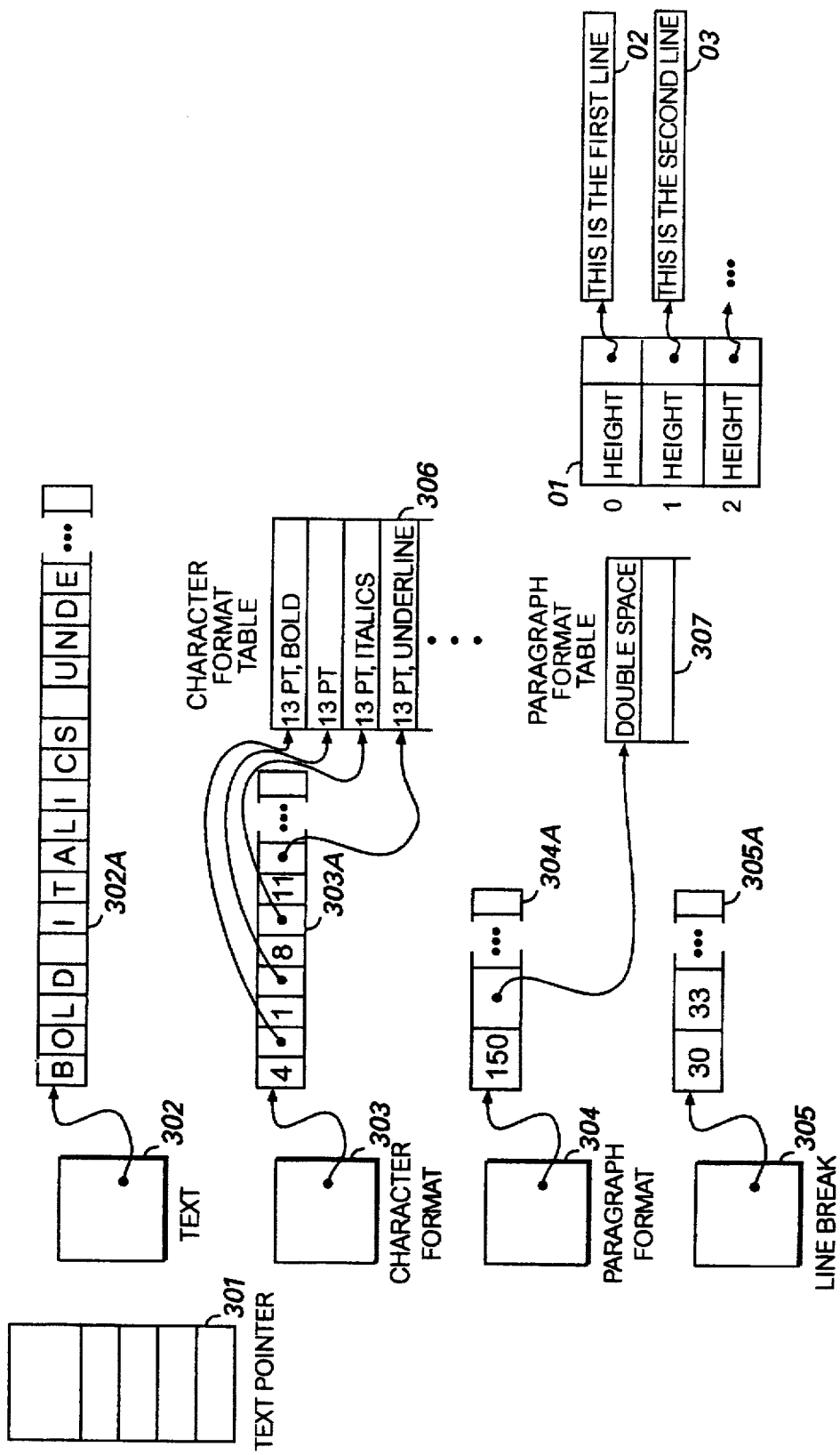

METHOD AND SYSTEM FOR UNIFORM ACCESS OF TEXTUAL DATA

CROSS-REFERENCE TO RELATED APPLICATION

This application is a continuation of U.S. patent application Ser. No. 08/612,654, filed Mar. 8, 1996, now abandoned.

TECHNICAL FIELD

This invention relates generally to a computer method and system for accessing data in a document and, more specifically, to a method and system for providing interfaces for uniform access to textual data.

BACKGROUND OF THE INVENTION

Many different types of computer programs provide the capability to manipulate textual data. The amount of manipulation varies depending on the primary function of the computer program. On one hand, word processing programs are designed primarily to manipulate textual data. Consequently, these word processing programs provide very sophisticated capabilities for manipulating textual data. For example, word processing programs typically provide for character and paragraph formatting, word searching, text moving, spell checking, and so on. On the other hand, most computer programs only provide for the manipulation of textual data in support of their primary function, which is not text manipulation. For example, a database program may provide capabilities to enter and edit a variable length string of textual data that is to be stored in a database. Other computer programs may only display textual data and may not allow the entry or editing of textual data.

Traditionally, the developer of each computer program would design and implement their own text manipulation functions to support the requirements of the computer program. Since the primary design purpose of a word processing program is to provide text manipulation, a developer of a word processing program would expend considerable effort in designing, writing, and testing very sophisticated functions. Conversely, the developer of a database program may expend very little effort in developing the needed text manipulation functions because text manipulation is not the primary purpose of a database program. Although a developer of a database program may be able to use some of the functions developed for a word processing program, in practice, there has been very little sharing of text manipulation functions among developers. In addition to the sharing of text manipulation functions, one program may simply want to know what text is, for example, currently being displayed by another program. Although some programs can receive and respond to commands that request access to text, such accessing of text is typically tailored to the specific needs of the applications. Moreover, the commands and protocols for accessing the text are application specific. Thus, if an application needs to access text of various other applications, the one application would need to know the application-specific commands and protocols of each of the other applications.

In the last few years, developers have been increasingly allowing the functionality of their computer programs to be "exposed" to other computer programs. The vast majority of these developers expose the functionality based on the Object Linking and Embedding (OLE) environment developed by Microsoft Corporation. OLE is described in the book by Kraig Brockschmidt, entitled "Inside OLE," Second Edition, 1995, Microsoft Press, which is hereby incorporated by reference. By using OLE, a developer can "expose" the "objects" of one computer program to another computer program. A computer program that exposes an object is generally referred to as a "server" because it provides services (functionality) through its exposed objects. Conversely, a computer program that accesses an exposed object is referred to as a "client."

In the following, some of the underlying concepts and capabilities of OLE are described. These are described by illustrating the sharing of objects when creating compound documents. A compound document is a document that contains objects generated by various computer programs. (Typically, only the data members of the object and the class type are stored in a compound document.) For example, a word processing document that contains a spreadsheet object generated by a spreadsheet program is a compound document. A word processing program allows a user to embed a spreadsheet object (e.g., a cell) within a word processing document. To allow this embedding, the word processing program using traditional techniques is compiled using the class definition of the object to be embedded to access function members of the embedded object. Thus, the word processing program would need to be compiled using the class definition of each class of objects that can be embedded in a word processing document. To embed an object of a new class into a word processing document, the word processing program would need to be recompiled with the new class definition. Thus, only objects of classes selected by the developer of the word processing program can be embedded. Furthermore, new classes can only be supported with a new release of the word processing program.

To allow objects of an arbitrary class to be embedded into compound documents, interfaces are defined through which an object can be accessed without the need for the word processing program to have access to the class definitions at compile time. An abstract class is a class in which a virtual function member has no implementation (pure). An interface is an abstract class with no data members and whose virtual functions are all pure.

The following class definition is an example definition of an interface. In this example, for simplicity of explanation, rather than allowing any class of object to be embedded in its documents, a word processing program allows spreadsheet objects to be embedded. Any spreadsheet object that provides this interface can be embedded, regardless of how the object is implemented. Moreover, any spreadsheet object, whether implemented before or after the word processing program is compiled, can be embedded.

```
class ISpreadSheet
    { virtual void File( ) = 0;
      virtual void Edit( ) = 0;
      virtual void Formula( ) = 0;
      virtual void Format( ) = 0;
      virtual void GetCell (string RC, cell *pCell) = 0;
      virtual void Data( ) = 0;
    }
```

The developer of a spreadsheet program would need to provide an implementation of the interface to allow the spreadsheet objects to be embedded in a word processing document. When the word processing program embeds a spreadsheet object, the program needs access to the code that implements the interface for the spreadsheet object. To access the code, each implementation is given a unique class identifier. For example, a spreadsheet object developed by Microsoft Corporation may have a class identifier of "MSSpreadsheet," while a spreadsheet object developed by another corporation may have a class identifier of "LTSSpreadsheet." A persistent registry in each computer system is maintained that maps each class identifier to the code that implements the class. Typically, when a spreadsheet program is installed on a computer system, the persistent registry is updated to reflect the availability of that class of spreadsheet objects. So long as a spreadsheet developer implements each function member defined by the interface and the persistent registry is maintained, the word processing program can embed the developer's spreadsheet objects into a word processing document.

Various spreadsheet developers may wish, however, to implement only certain function members. For example, a spreadsheet developer may not want to implement database support, but may want to support all other function members. To allow a spreadsheet developer to support only some of the function members, while still allowing the objects to be embedded, multiple interfaces for spreadsheet objects are defined. For example, the interfaces IDatabase and IBasic may be defined for a spreadsheet object as follows.

```
class IBasic
    { virtual void File( ) = 0;
      virtual void Edit( ) = 0;
      virtual void Formula( ) = 0;
      virtual void Format( ) = 0;
      virtual void GetCell (string RC, cell *pCell) = 0;
    }
class IDatabase
    { virtual void Data( ) = 0;
    }
```

Each spreadsheet developer would implement the IBasic interface and, optionally, the IDatabase interface.

At run time, the word processing program would need to determine whether a spreadsheet object to be embedded supports the IDatabase interface. To make this determination, another interface is defined (that every spreadsheet object implements) with a function member that indicates which interfaces are implemented for the object. This interface is named IUnknown (and referred to as the unknown interface or the object management interface) and is defined as follows.

```
class IUnknown
    { virtual HRESULT QueryInterface (REFIID iid, void **ppv) = 0;
      virtual ULONG AddRef( ) = 0;
      virtual ULONG Release ( ) = 0;
    }
```

The IUnknown interface defines the function member (method) QueryInterface. The method QueryInterface is passed an interface identifier (e.g., "IDatabase") in parameter id (of type REFIID) and returns a pointer to the implementation of the identified interface for the object for which the method is invoked in parameter ppv. If the object does not support the interface, then the method returns a false. (The type HRESULT indicates a predefined status, and the type ULONG indicates an unsigned long integer.)

CODE TABLE 1

```
HRESULT XX::QueryInterface(REFIID iid, void **ppv)
    { ret = TRUE;
      switch (iid)
        { case ID_IBasic:
            *ppv = *pIBasic;
            break;
          case ID_Database:
            *ppv = *pIDatabase;
            break;
          case ID_IUnknown:
            *ppv = this;
            break;
          default:
            ret = FALSE;
        }
      if (ret == TRUE){AddRef( );};
      return ret;
    }
```

Code Table 1 contains C++ pseudocode for a typical implementation of the method QueryInterface for class XX, which inherits the class IUnknown. If the spreadsheet object supports the IDatabase interface, then the method QueryInterface includes the appropriate case label within the switch statement. The variables pIBasic and pIDatabase point to a pointer to the virtual function tables of the IBasic and IDatabase interfaces, respectively. The method QueryInterface invokes the method AddRef (described below) to increment a reference count for the object of class XX when a pointer to an interface is returned.

CODE TABLE 2

```
void XX::AddRef( ) {refcount++;}
void XX::Release( ) {if (—refcount==0) delete this;}
```

The interface IUnknown also defines the methods AddRef and Release, which are used to implement reference counting. Whenever a new reference to an interface is created, the method AddRef is invoked to increment a reference count of the object. Whenever a reference is no longer needed, the method Release is invoked to decrement the reference. count of the object and, when the reference count goes to zero, to deallocate the object. Code Table 2 contains C++ pseudocode for a typical implementation of the methods AddRef and Release for class XX, which inherits the class IUnknown.

The IDatabase interface and IBasic interface inherit the IUnknown interface. The following definitions illustrate the use of the IUnknown interface.

```
class Database : public IUnknown
    { public:
        virtual void Data( ) = 0;
    }
class IBasic : public IUnknown
    { public:
        virtual void File( ) = 0;
        virtual void Edit( ) = 0;
        virtual void Formula( ) = 0;
        virtual void Format( ) = 0;
        virtual void GetCell (string RC, cell *pCell) = 0;
    }
```

FIG. 1 is a block diagram illustrating a sample data structure of a spreadsheet object. The spreadsheet object comprises object data structure 101, IBasic interface data structure 103, IDatabase interface data structure 104, the virtual function tables 102, 105, 106 and methods 107 through 121. The object data structure 101 contains a pointer to the virtual function table 102 and pointers to the IBasic and IDatabase interface. Each entry in the virtual function table 102 contains a pointer to a method of the IUnknown interface. The IBasic interface data structure 103 contains a pointer to the virtual function table 105. Each entry in the virtual function table 105 contains a pointer to a method of the IBasic interface. The IDatabase interface data structure 104 contains a pointer to the virtual function table 106. Each entry in the virtual function table 106 contains a pointer to a method of the IDatabase interface. Since the IBasic and IDatabase interfaces inherit the IUnknown interface, each virtual function table 105 and 106 contains a pointer to the methods QueryInterface, AddRef, and Release. In the following, an object data structure is represented by the shape 122 labeled with the interfaces through which the object may be accessed.

The following pseudocode illustrates how a word processing program determines whether a spreadsheet object supports the IDatabase interface.

```
if (pIBasic->QueryInterface("IDatabase",&pIDatabase)==S_OK)
    IDatabase supported
else
    IDatabase not supported
```

The pointer pIBasic is a pointer to the IBasic interface of the object. If the object supports the IDatabase interface, the method QueryInterface sets the pointer pIDatabase to point to the IDatabase data structure and returns the value S_OK.

Normally, an object can be instantiated (an instance of the object created in memory) by a variable declaration or by the "new" operator. However, both techniques of instantiation need the class definition at compile time. A different technique is needed to allow a word processing program to instantiate a spreadsheet object at run time. One technique provides a global function CreateInstanceXX, which is defined in the following.

static void CreateInstanceXX (REFIID iid, void **ppv) =0;

The method CreateInstanceXX (known as a class factory) instantiates an object of class XX and returns a pointer ppv to the interface of the object designated by parameter iid.

The spreadsheet program is a server and the word processing program is a client because the word processing program uses services provided in the spreadsheet program.

It would be desirable if a uniform mechanism were established by which a client computer program could access services of a word processing program to control the manipulation of textual data. With such a uniform mechanism, developers of computer programs whose primary function is not text manipulation would not need to design and implement any text manipulation functions. Rather, the developers could design their computer programs to access the services provided by sophisticated text manipulation function through a uniform interface. In addition, to save development time and cost, the provided text manipulation function would typically be more sophisticated than if designed by the developer.

SUMMARY OF THE INVENTION

The present invention provides a method and a system for providing clients with uniform access to text that is provided by servers. To provide this service, the system represents text as a document object and portions of the text as a range object. For each document object to be exposed to clients, the server receives an indication of a range of characters of the text and creates a range object that identifies the range and that provides a member function for accessing the characters in the range. Each of the clients provides means for sending the indication of the range of characters to the text server, for receiving an indication of the created range object, and for using the received indication of the created range object to invoke the member function to access the characters in the range. The document and range objects provide a uniform mechanism for the manipulation of text.

In another aspect, the present invention provides a method and computer system for processing of data that has a plurality of characters. The computer system has a client and a server computer program. The client computer program sends to the server computer program a request to define a plurality of ranges of the data. Each of the ranges has at least one property. The server computer program receives the request to define the plurality of ranges of data, and in response, associates a range object with each of the plurality of ranges. Each range object has a member function for accessing the characters within the associated range. A client computer program then sends to the server a request to modify a selected one of the defined ranges in such a way that the property of the selected range is affected. The server computer program receives the request to modify the selected range, and in response, invokes the member function of the range object associated with the selected range. The member function modifies a selected range in accordance with the received request and for each of the plurality of defined ranges that are affected by the modification to the selected range. The member function adjusts the property of the defined range to reflect the effect that the modification of the selected range has on the defined range.

BRIEF DESCRIPTION OF THE DRAWINGS

FIG. 3A is a block diagram of a sample data structure representing text.

FIG. 3B illustrates a data structure used to support the determination as to what character is displayed at a certain screen position.

DETAILED DESCRIPTION OF THE INVENTION

The present invention provides a method and system through which an application program can access documents through a common text accessing interface, referred to as the Text Object Model (TOM). TOM specifies a hierarchy of interfaces through which various text manipulation functions can be accessed. These functions control the editing and displaying of text. These interfaces are the ITextDocument interface, the ITextRange interface, the ITextSelection interface, the ITextStoryRanges interface, the ITextFont interface, and the ITextPara interface. These interfaces provide a uniform mechanism through which text of a document can be manipulated.

TOM provides a hierarchical model of a document. Each document comprises one or more "stories." A story is an application-defined collection of text. For example, a word processing document may have a story for the main text of the document, a story for the footnotes, and a story containing words for which to create an index for the document. Each story is viewed as a contiguous section of text (e.g., characters) starting at character position 0 and extending to the character position corresponding to the number of is characters in the story. Thus, character positions 0 through 9 represent the first ten characters in a story. TOM provides for the manipulation of text through the concept of a "range" of text. A range is a contiguous string of characters within a story. When a range is defined, an initial start and limit character position are defined for the range. The range encompasses the characters starting at the start character position up to, but not including, the character at the limit character position. Thus, the number of characters in the range is equal to the limit character position minus the start character position. Also, a range is empty if its start and limit character positions are equal. When a range is empty, the range is referred to as an "insertion point." A range that is empty has its start and limit character position set to the same character position. The insertion point is immediately before the start character position within the story. If characters are added to an empty range, the characters are inserted at the insertion point within the story.

Figure 1:
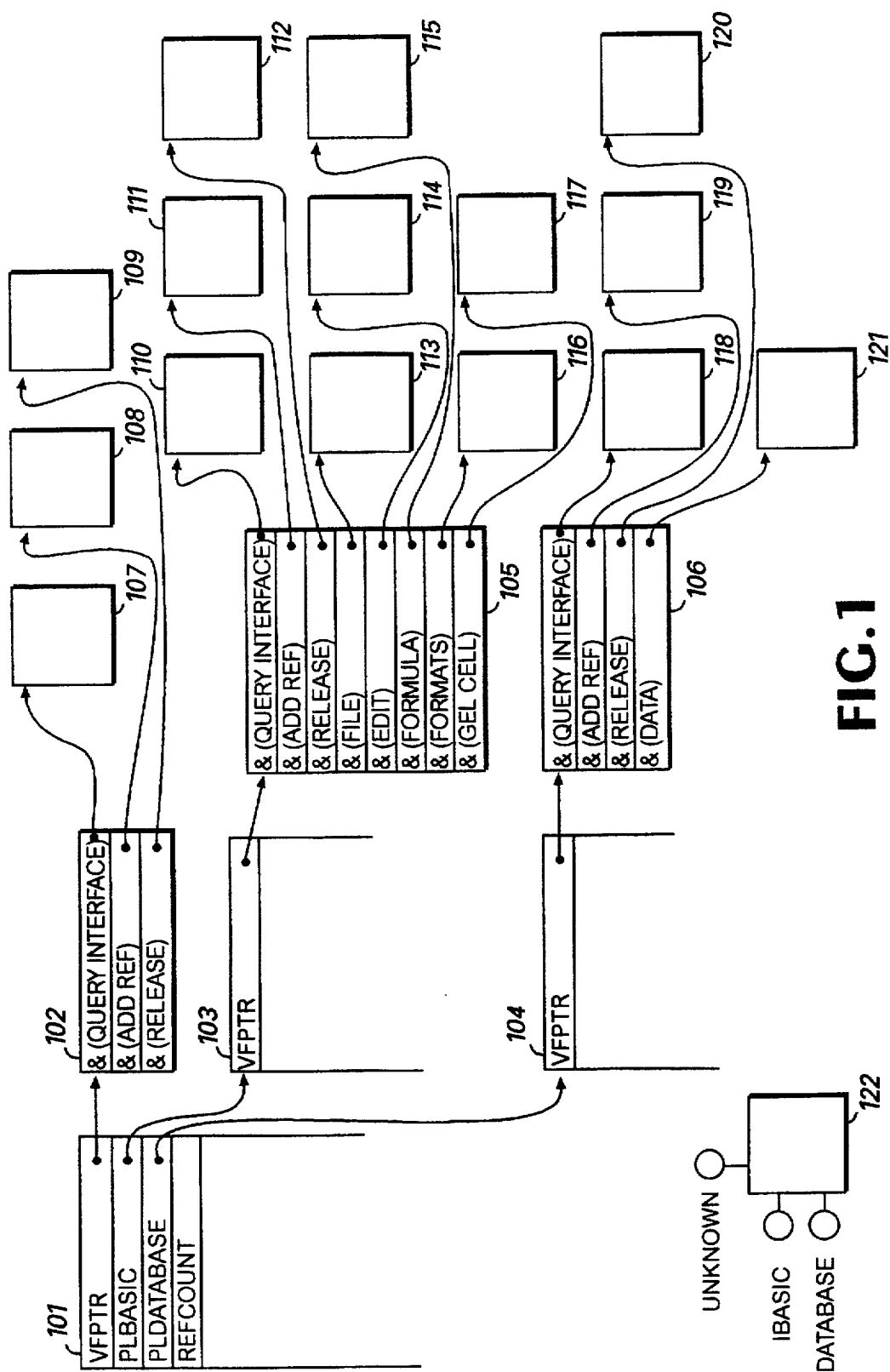
FIG. 1 is a block diagram illustrating a sample data structure of a spreadsheet object.
Figure 2B:
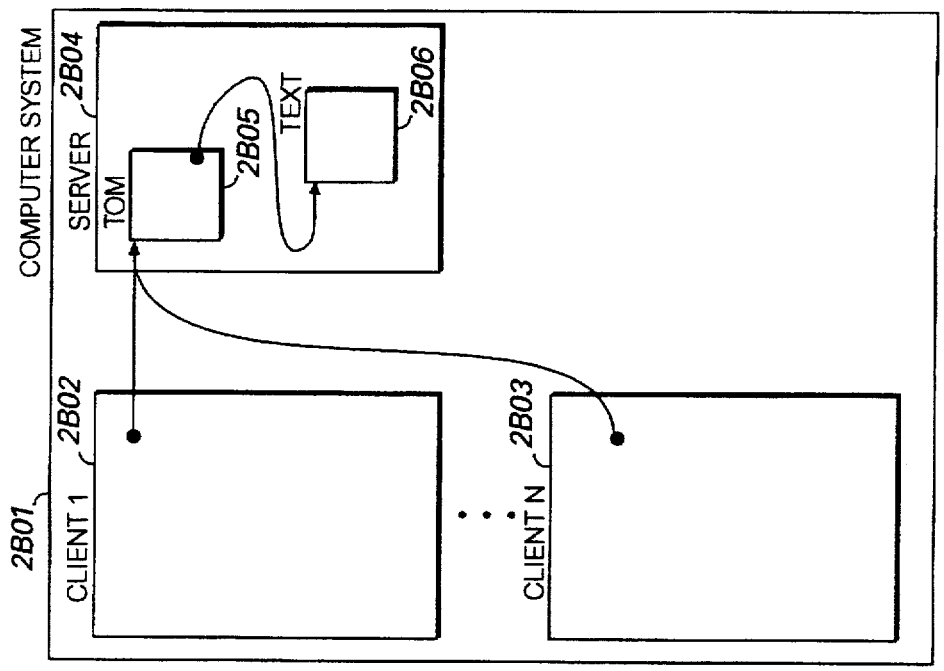
FIG. 2B is a block diagram illustrating a computer system in a preferred embodiment.
Figure 2A:
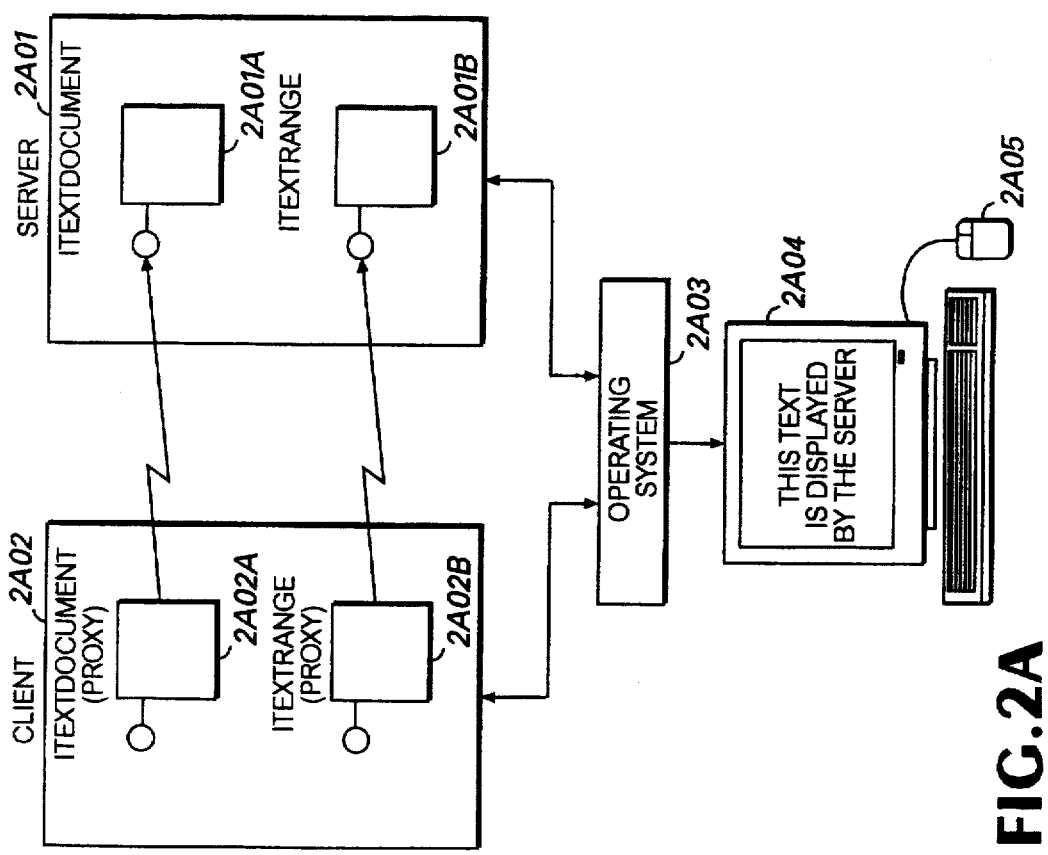
FIG. 2A is a block diagram illustrating the use of the TOM interfaces.

FIG. 2A is a block diagram illustrating the use of the TOM interfaces. This example shows a server 2A01 with a document object 2A01a and a range object 2A01b, a client 2A02 with a document object proxy 2A02a and a range object proxy 2A02b, an operating system 2A03, a display 2A04, and pointing device 2A05. The server, which can be a word processing program, controls the display of the text on the display device by invoking the application program interfaces (APIs) provided by the operating system. In this example, the client provides a capability to aid in the accessibility of the server. The term "accessibility" refers to the general concept of making computer programs easier to use by those persons with physical limitations (e.g., with limited sight). The client provides the capability to input an X,Y screen coordinate as indicated by the pointing device and announces the text that is displayed at the screen coordinate. The client initially requests to the server to provide access to a document object for the text displayed on the screen. In response, the server instantiates the document object 2A01a and marshals a reference to the document object to the client. In a preferred embodiment, the client instantiates the document object proxy 2A02a. The concept of marshaling is described in the OLE documentation referenced in the "Background of the Invention." The client then receives a request from a user to announce the text at a certain screen position. In response to the request, the client invokes a member function of the document object proxy, which forwards the request to the server to provide the text displayed at the screen position. Upon receiving the request, the server invokes a member function of the document object passing the screen coordinates. The member function determines the insertion point of the text that is displayed near that screen coordinate and instantiates a range object to point to that insertion point. The server then marshals a reference to the range object to the client. Upon receiving the marshaled reference, the client instantiates the range object proxy. The client then invokes a member function of the range object proxy to retrieve the text displayed near the screen coordinates. Upon receiving the text, the client announces the text. Although shown in this example as executing in separate processes, one skilled in the art would appreciate that the server and client could execute within the same process.

Any program that provides the standard TOM interfaces and uses the standard TOM interfaces can access each others' text. For example, the client 2A02 that is designed to announce text can be used with any server that supports the TOM interfaces. Conversely, the server can provide access to any client that is TOM aware. In particular, the client and server can execute on separate computer systems connected through various means, such as a local area network or the Internet. For example, the client may be a Web spider whose function is to examine information provided by Internet servers. Each Internet server could expose the TOM interfaces. In this way, the Web spider would have a uniform interface for accessing the text of the servers.

Conceptually, TOM represents each document as a document object and each range as a range object. A document object contains one or more stories. Each story is a contiguous string of characters and associated properties. A document object provides the function members of the ITextDocument interface for opening and closing the document, defining ranges, manipulating ranges, and collecting edits. A range object specifies the start and limit character positions of the range and the story for which the range is defined, and provides function members for manipulating the characters in the range through the ITextRange interface. The function members provide for deleting, copying, replacing, expanding, and moving the range. For example, all the characters in a range can be deleted from the story or the end of the range can be extended to encompass a number of additional contiguous characters.

TOM allows multiple. ranges to be defined within a story. For example, a first range can be defined initially with a start character position of 15 and an limit character position of 25, and a second range can be defined initially with a start character position of 30 and an limit character position of 35. TOM provides the functionality to manipulate the characters within a range "independently" of other ranges. Continuing with the example, the first range can be deleted, copied, replaced, or expanded, or have its character and paragraph formats changed without affecting the characters in the second range. However, any changes that affect the size (i.e., number of characters encompassed) of the first range are reflected in the start and limit character positions of ranges that are after the first range. For example, if the characters in the first range are deleted, then the start and limit character positions of the first range are set to 15 and the start and limit character position of the second range are set to 20 and 25, respectively. The following illustrates the characters in the story with every tenth character position identified. The first range has a start and limit character position of 15 and 25. In the following, such a range is represented as [15,25), where the "[" indicates that the character at the character position of 15 is included in the range and the ")" indicates that the character at the character position of 25 is not included in the range. The second range is [30,35). The ranges are delimited by underlining.

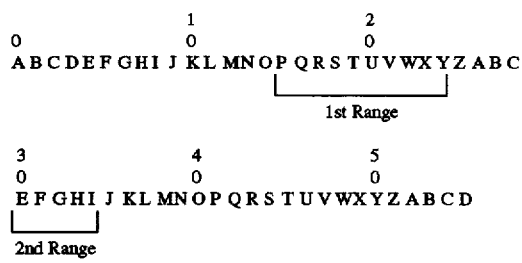

The following shows the story after all the characters in the first range have been deleted.

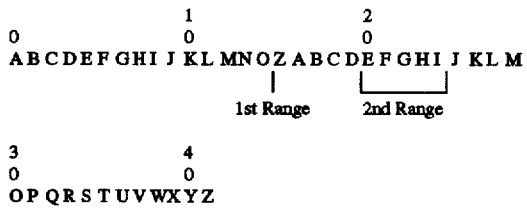

The first range is (15,15), which indicates an empty range, that is an insertion point, and the second range is [20,25).

To facilitate the manipulation of text, TOM allows the characters in a story to be accessed in various units, including words, lines, sentences, paragraphs, runs of constant formatting, and windows. Each of these units are separately indexed. For example, if a story has 300 characters forming 50 word units, then the words in the story are indexed from 1 to 50. Similarly, if the story has 10 sentences, then the sentences in the story are indexed from 1 to 10. TOM provides access to the characters and units of a story through a range object that initially encompasses all the characters in the range.

TOM defines the ITextSelection interface for providing user interface oriented manipulations of a displayed range. The ITextSelection interface is logically provided by a range object. Conceptually, a selected text corresponds to text that is displayed on a screen and that is a selected portion of the document that a user has indicated is to be manipulated. Selected text has an active end, corresponding to either the start character position or the limit character position, whichever was last changed. The ITextSelection interface supports manipulation of selections analogously to standard to those provided by typical word processors. For example, the active end of a selection may be moved to encompass the next word, next line, next paragraph, and so on.

TOM provides the ITextStoryRanges interface to access the stories within a document. The ITextStoryRanges interface is logically provided by a story object. The ITextStoryRanges interface provides function members for enumerating the ranges within a story and for instantiating range objects that encompass a story.

FIG. 2A is a block diagram illustrating a computer system in a preferred embodiment. One skilled in the art would appreciate that the computer system 2B01 may be a single computer or a network of computers. The computers are preferably standard computers that include a central processing unit, a memory, storage devices, and input/output devices. As shown, the computer system includes multiple client computer programs 2B02-2B03 and a server computer program 2B04. The server includes an implementation of the Text Object Model (TOM) 2B05 and includes text 2B06. The server exposes objects for manipulating the text to the clients. The client can invoke methods of the exposed objects to perform desired manipulation of text.

TOM defines four interfaces through which the text can be accessed and manipulated, ITextDocument, ITextStoryRanges, ITextRange, and ITextSelection. TOM also defines the interfaces ITextFont and ITextPara for setting character and paragraph formatting within a range. The ITextDocument interface provides methods for creating range objects with the ITextRange interface through which an application can access range of text within the active story of a document. The active story is the last story that has been accessed. The range of text to which a range object refers can be manipulated through methods of the ITextRange interface.

FIG. 3 is a block diagram of a sample data structure representing text. The data structure comprises a text pointer object 301 that points to four objects 302-305. The text object 302 represents the text; the character format object 303 represents the character formatting for the text; the paragraph format object 304 represents the paragraph formatting for the text; and the line break object 305 represents the line breaks as the text is displayed. Each of the objects 302-305 refers to one of four arrays. The array 302A contains an entry for each character in the text and is indexed by the character position. The array 303A contains entries describing runs of characters in the text that have the same character formatting. Each entry contains a count field and a format field. The count field indicates the number of characters in the run, and the format field contains an index into an entry of the character format table 306 that describes the character formatting for the run. The character format table 306 contains an entry describing each unique character formatting in the text. The first entry of the array 303A contains the count of 4 and a reference to the first entry of the character format table 306. The first entry indicates that the character format is 13 point and bold. The array 304A contains entries describing runs of characters in the text that have the same paragraph formatting. Each entry contains a count field and a format field. The count field indicates the number of characters in the paragraph, and the format field contains an index into an entry of the paragraph format table 307 that describes the paragraph formatting. The array 305A contains entries describing the number of characters of the text that is displayed is in each line when the text is displayed.

FIG. 3B illustrates a data structure used to support the determination as to what character is displayed at a certain screen position. The line array 3B01 contains an entry for each line displayed on the screen. Each entry contains the height of a line as displayed and a reference to the characters in the line. The strings 3B02 and 3B03 contain the characters of the line. When the preferred implementation of the ITextDocument interface receives a screen position, it first determines the corresponding line based on the heights in the line array. The implementation then determines the width of the characters in the string referred to by the reference for that line. The widths are determined based on the character formatting (i.e., font).

Figure 4:
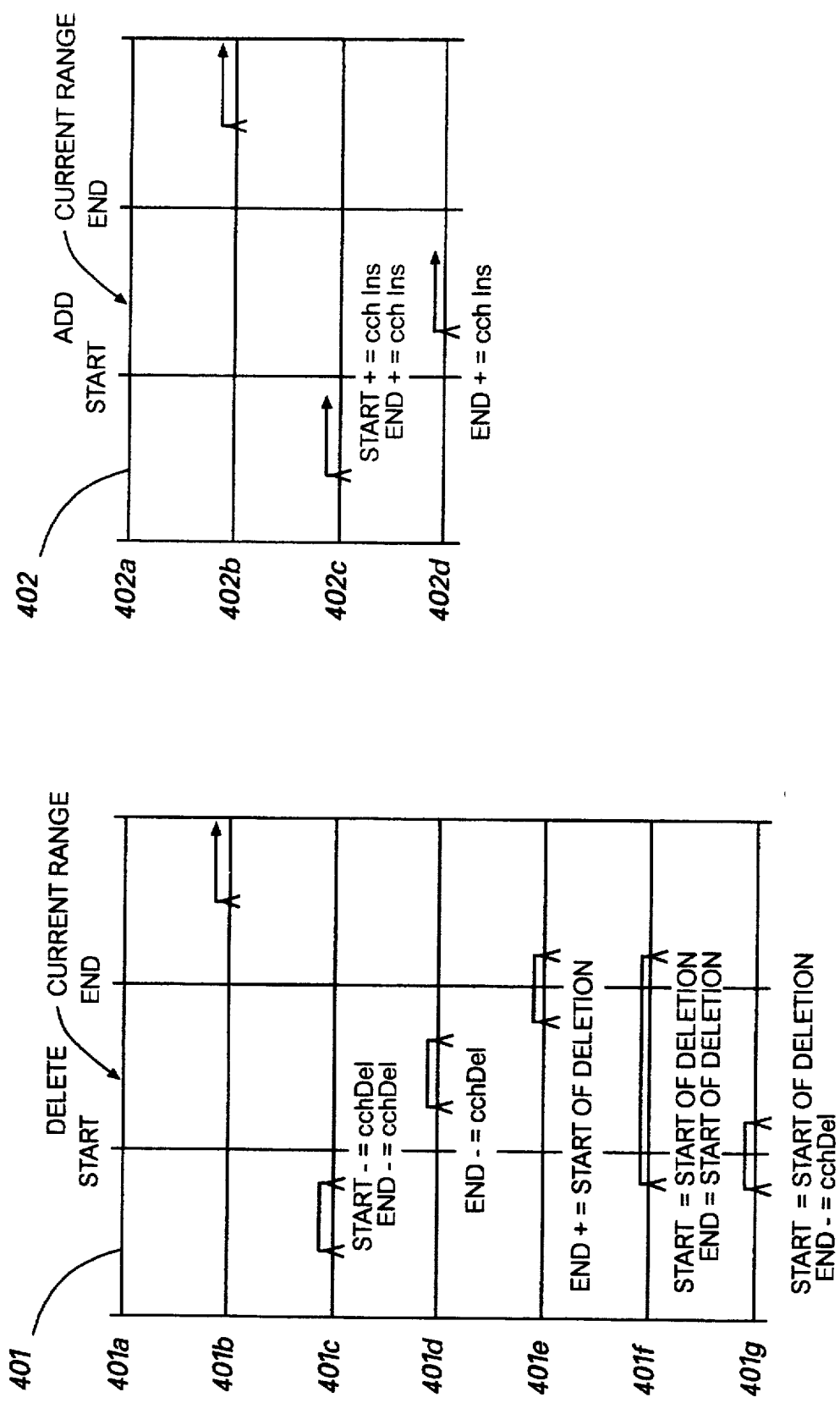
FIG. 4 is a diagram illustrating the updating of text ranges defined on the same story.

FIG. 4 is a diagram illustrating the updating of text ranges defined on the same story. As discussed above, when the length of a range is changed, then the start character positions and the limit character positions of the other ranges on that same story may need to be adjusted to reflect the addition or deletion of characters. In general, if all the characters in a range are before the characters in the adjusted range, then that range is not adjusted. However, if all the characters in a range are after the characters in the adjusted range, then the start and end character positions need to be adjusted based on the change in size of the adjusted range.

When decreasing the size of a range, the characters deleted can be in 1 of 6 different locations relative to the other ranges. If the decrease results from replacing the range, then the characters deleted are considered to be at the end of the decreased range. The deleted characters can be (1) after the other range, (2) entirely before the other range, (3) entirely within the other range, (4) starting within the other range and ending past the other range, (5) encompassing the entire other range, and (6) starting before the other range and ending past the other range, which are illustrated by the lines of 401a–401g. Line 401a illustrates that the other range is delimited by start and limit character positions. Line 401b is illustrates that when the characters to be deleted are after the other range, the start and limit character positions of the other range is not adjusted. Line 401c illustrates that when the characters to be deleted are entirely before the other range, then both the start and limit character positions of the other range are adjusted by the number of characters deleted. Line 401d illustrates that when the characters to be deleted are entirely within the other range, then the limit character position of the other range is adjusted by the number of characters deleted. Line 401e illustrates that when the characters to be deleted start within the other range and end past the other range, then the limit character position of the other range is set to the character position of the start of the deletion. Line 401f illustrates that when the characters to be deleted entirely encompass the other range, then both the start and limit character position of the other range are set to the character position of the start of the deletion. Line 401g illustrates that when the characters to be deleted start before the other range and end within the other range, then the start character position of the other range is set to the character position of the start of the deletion and the limit character position of the other range is adjusted by the number of characters deleted.

When increasing the size of a range, the character position at which the characters are added can be in 1 of 3 different locations relative to the other ranges. If the increase results from replacing the range, then the characters added are to be considered at the end of the range before it is increased. When increasing the size of the range, the insertion character position can be (1) after the other range, (2) before the other range, or (3) within the other range, which are illustrated by the lines 402a–402d. Line 402a illustrates that the other range is delimited by start and limit character positions. Line 402b illustrates that when the insertion character position is after the other range, then the start and limit character positions of the other range are not adjusted. Line 402c illustrates that when the insertion character position is before the other range, then the start and limit character positions of the other range are adjusted by the number of inserted characters. Line 402d illustrates that when the insertion point is within the other range, then the limit character position of the other range is adjusted by the number of inserted characters.

Figure 5:
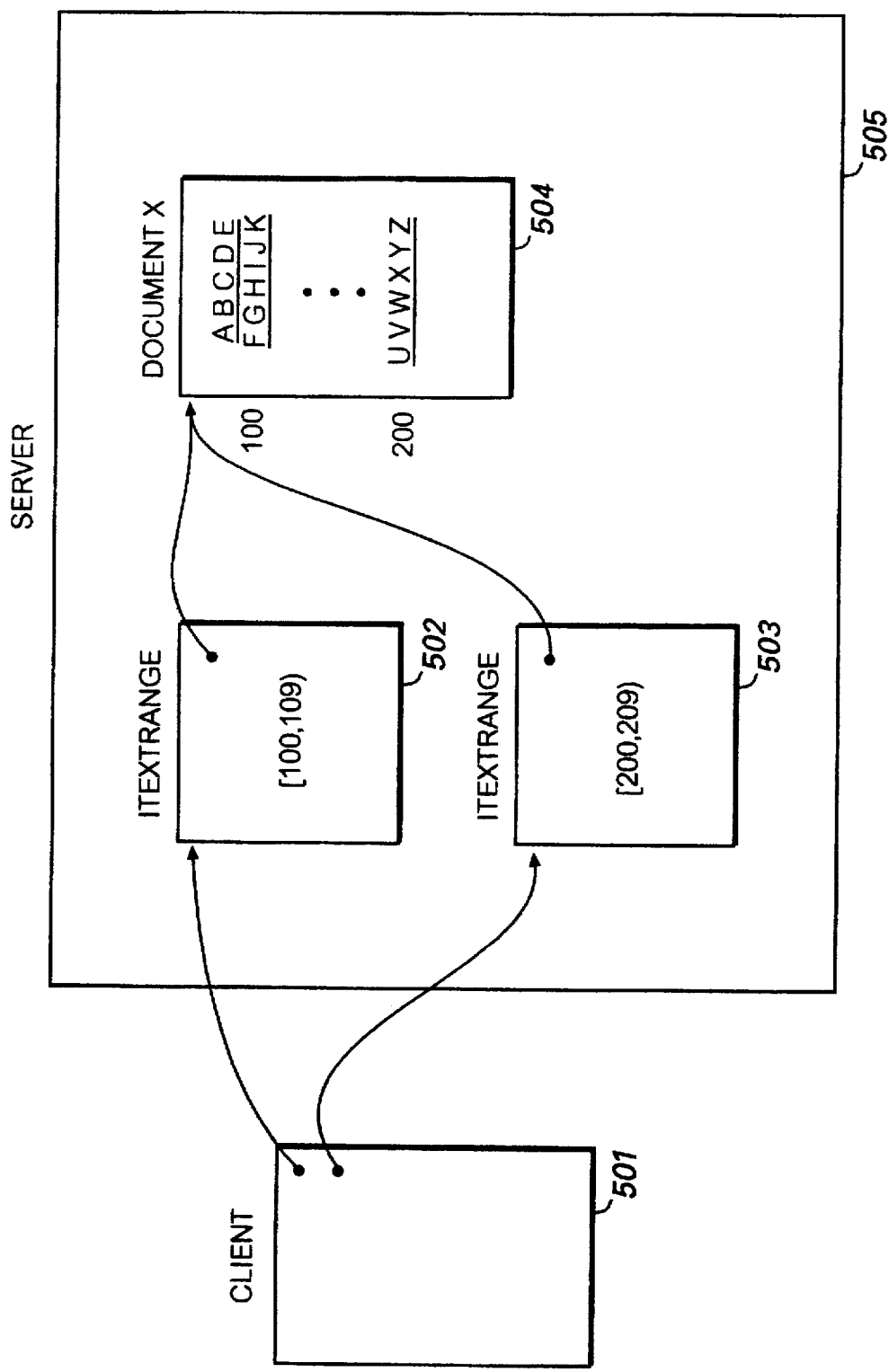
FIG. 5 illustrates the automatic adjusting of a range when the size of another range is changed.

FIG. 5 illustrates the automatic adjusting of a range when the size of another range is changed. The server 505 has two range objects 502 and 503. The range object 502 corresponds to the range currently [100,109) in document 504. The range object 503 corresponds to the range [200,204) in document 504. If the range represented by the range object 502 is deleted, then the limit character position of that range is set to start character position to indicate an empty range, that is, (100,100). Also, the start and limit character positions of the range object 503 are adjusted by the number of characters deleted, that is [190,194). If, however, the range represented by range object 503 is deleted, then the range represented by the range object 502 need not be adjusted.

The above examples illustrate that all the range objects refer to a single copy of the text. However, it may be more efficient in a distributed environment to allow each client to have its own copy of the text. Thus, when one client changes the length of a range, then the change is reflected in each copy. Moreover, in such a distributed environment, changes that do not affect the length of the text may need to be reflected in all the range objects. For example, if the format of a character is changed, it needs to be reflected in all copies of the text.

ITextDocument Interface

A document object provides the ITextDocument interface for accessing the characters of the document. The ITextDocument interface provides methods for opening, creating, and saving a document, for collecting a series of edits to the document, and for creating and providing access to range objects. The characters of each story are accessed through an ITextRange interface of a range object. A document object has one active selection and one active story at a given instance. These are the last selection and story accessed by any method. The various stories of a document object can be accessed through the ITextStoryRanges interface of the document object. Below is a definition of the ITextDocument interface.

```
class ITextDocument:IDispatch
{
    STDMETHODIMP BeginEditCollection(void) = 0
    STDMETHODIMP EndEditCollection(void) = 0
    STDMETHODIMP Freeze(long * pValue) = 0
    STDMETHODIMP GetName(BSTR * pName) = 0
    STDMETHODIMP GetSelection(ITextSelection ** ppSel) = 0
    STDMETHODIMP GetStoryCount(LONG * pCount) = 0
    STDMETHODIMP GetStoryRanges(ITextStoryRanges ** ppStories) = 0
    STDMETHODIMP New(void) = 0
    STDMETHODIMP Open(VARIANT FAR * pVar) = 0
    STDMETHODIMP Range(long cpFirst, long cpLim, ITextRange ** ppRange) = 0
    STDMETHODIMP RangeFromPoint(long x, long y, ITestRange ** ppRange) = 0
    STDMETHODIMP Redo(long Count) = 0
    STDMETHODIMP Save(VARIANT * pVar) = 0
    STDMETHODIMP Undo(long Count) = 0
    STDMETHODIMP Unfreeze(long * pCount) = 0
}
```

ITextDocument::BeginEditCollection
STDMETHODIMP BeginEditCollection(void)

This method indicates the start of a collection of edit operations. A collection of edit operations represents edits that can be undone in a single operation. For example, the individual deletion of contiguous characters may represent a single collection because a user may want to undo the contiguous deletion with a single operation.

ITextDocument::EndEditCollection
STDMETHODIMP EndEditCollection(void)

This method indicates that current collection of edits is complete. The BeginEditCollection can be invoked to start a new collection of edits.

ITextDocument::Freeze
STDMETHODIMP Freeze(long * pValue)

This method increments a freeze count and returns the incremented freeze count. Some problems can occur if text is rapidly edited and a screen is updated after each edit. In particular, the performance overhead of such updating can be excessive and flickering of the screen can result. Thus, TOM provides a mechanism for disabling the updating of the screen. TOM uses a freeze count to track of number of times that requests have been received to freeze the screen. TOM increments the freeze count each time a request to freeze is received and decreases the freeze count each time a request is received to unfreeze the screen. The screen is only updated while the freeze count is zero.

ITextDocument::GetStoryCount
STDMETHODIMP GetStoryCount(LONG * pCount)

This method returns the number of stories in the document.

ITextDocument::GetName
STDMETHODIMP GetName(BSTR * pName)

This method returns the filename of the document. For example, if the document is a word processing document, then the filename of that word processing document is returned.

ITextDocument::GetSelection
STDMETHODIMP GetSelection(ITextSelection ** ppSel)

This method returns a pointer to an ITextSelection interface of the range object that represents the active selection of the document.

ITextDocument::GetStoryRanges
STDMETHODIMP GetStoryRanges(ITextStoryRanges ** ppStories)

This method returns a pointer to an ITextStoryRanges interface for the document object.

ITextDocument::New
STDMETHODIMP New(void)

This method closes the document associated with the document object and creates a new (empty) document with a default name.

ITextDocument::Open
STDMETHODIMP Open(VARIANT FAR * pVarLongFlags)

This method opens the document with the passed filename in the mode indicated by the passed flag.

ITextDocument::Range
STDMETHODIMP Range(long cpFirst, long cpLim, ITextRange ** ppRange)

This method returns a pointer to an ITextRange interface of a range object for the active story with the passed start and limit character positions.

ITextDocument::RangeFromPoint
STDMETHODIMP RangeFromPoint(long x, long y, ITextRange ** ppRange)

This method returns a pointer to an ITextRange interface for a range object that corresponds to the character position of the insertion point closest to the passed x and y screen coordinates. The insertion point is indicated by a range with the start character position equal to the limit character position.

ITextDocument::Redo
STDMETHODIMP Redo(long Count)

This method re-executes the edits in the last collection of edits specified. The passed count indicates of edits are to be re-executed.

ITextDocument::Save
STDMETHODIMP Save(VARIANT * pVarLongFlags)

This method saves the text contained in the document object to the file indicated by the filename in the mode indicated by the passed flag.

ITextDocument::Undo
STDMETHODIMP Undo(long Count)

This method undoes the edits in the last collection of edits specified. The passed count indicates the number of edits are to be undone.

ITextDocument::Unfreeze
STDMETHODIMP Unfreeze(long * pCount)

This method decrements the freeze count and returns the decremented freeze count.

ITextRange Interface

A range object provides the ITextRange interface for accessing the characters of the range. The range is delimited by a start and limit character position within the story upon which the range is defined. The start character position is always less than or equal to the limit character position. If one end of the range is moved past the other end in a move command, the start character position becomes the limit character position, and the limit character position becomes the start character position. Below is a definition of the ITextRange interface.

```
class ITextRange:IDispatch
{
STDMETHODIMP CanEdit(long * pbCanEdit) = 0
STDMETHODIMP CanPaste(IUnknown * pIDataObject, long * pb) = 0
STDMETHODIMP ChangeCase(long Type) = 0
STDMETHODIMP Collapse(long bStart) = 0
STDMETHODIMP Copy(IUnknown ** ppIDataObject) = 0
STDMETHODIMP Cut(IUnknown ** ppIDataObject) = 0
STDMETHODIMP Delete(long Unit, long Count, long * pDelta) = 0
STDMETHODIMP EndOf(long Unit, long Extend, long * pDelta) = 0
STDMETHODIMP Expand(long Unit, long * pDelta) = 0
STDMETHODIMP FindText(BSTR bstr, long Count, long Flags, long * pLength) = 0
STDMETHODIMP FindTextEnd(BSTR bstr, long Count, long Flags, long * pLength) = 0
STDMETHODIMP FindTextStart(BSTR bstr, long Count, long Flags, long * pDelta) = 0
```

-continued

```
STDMETHODIMP GetChar(long * pChar) = 0
STDMETHODIMP GetDuplicate(ITextRange ** ppRange) = 0
STDMETHODIMP GetEnd(long * pcpLim) = 0
STDMETHODIMP GetFont(ITextFont ** ppFont) = 0
STDMETHODIMP GetFormattedText(ITextRange ** ppRange) = 0
STDMETHODIMP GetIndex(long Unit, long * pIndex) = 0
STDMETHODIMP GetPara(ITextPara ** ppPara) = 0
STDMETHODIMP GetPoint(ITextPara ** ppPara) = 0
STDMETHODIMP GetStart(long * pcpFirst) = 0
STDMETHODIMP GetStoryLength(long * pCount) = 0
STDMETHODIMP GetStoryType(long * pValue) = 0
STDMETHODIMP GetText(BSTR * pbstr) = 0
STDMETHODIMP InRange(ITextRange * pRange, long * pb) = 0
STDMETHODIMP InStory(ITextRange * pRange, long * pb) = 0
STDMETHODIMP IsEqual(ITextRange * pRange, long * pb) = 0
STDMETHODIMP Move(long Unit, long Count, long * pDelta) = 0
STDMETHODIMP MoveEnd(long Unit, long Count, long * pDelta) = 0
STDMETHODIMP MoveEndUntil(VARIANT * Cset, long Count, long * pDelta) = 0
STDMETHODIMP MoveEndWhile(VARIANT * Cset, long Count, long * pDelta) = 0
STDMETHODIMP MoveStart(long Unit, long Count, long * pDelta) = 0
STDMETHODIMP MoveStartUntil(VARIANT * Cset, long Count, long * pDelta) = 0
STDMETHODIMP MoveStartWhile(VARIANT * Cset, long Count, long * pDelta) = 0
STDMETHODIMP MoveUntil(VARIANT * Cset, long Count, long * pDelta) = 0
STDMETHODIMP MoveWhile(VARIANT * Cset, long Count, long * pDelta) = 0
STDMETHODIMP Paste(IUnknown * pIDataObject) = 0
STDMETHODIMP ScrollIntoView(long Code) = 0
STDMETHODIMP Select( ) = 0
STDMETHODIMP SetChar(long Char) = 0
STDMETHODIMP SetEnd(long cp) = 0
STDMETHODIMP SetFont(ITextFont * pFont) = 0
STDMETHODIMP SetFormattedText(ITextRange * pRange) = 0
STDMETHODIMP SetIndex(long Unit, long Index, long Extend) = 0
STDMETHODIMP SetPara(ITextPara * pPara) = 0
STDMETHODIMP SetPoint(long x, long y, long Extend) = 0
STDMETHODIMP SetRange(long cpFirst, long cpLim) = 0
STDMETHODIMP SetStart(long cp) = 0
STDMETHODIMP SetText(BSTR bstr) = 0
STDMETHODIMP StartOf(long Unit, long Extend, long * pDelta) = 0
}
```

ITextRange::CanEdit
STDMETHODIMP ITextRange::CanEdit(long * pbCanEdit)

This method returns a flag indicating whether the range can be edited. For example, if the range corresponds to characters in a label next to an edit box, then a client would not be able to edit the characters.

ITextRange::CanPaste
STDMETHODIMP ITextRange::CanPaste(IUnknown * pIDataObject, long * pb)

This method returns a flag indicating whether the passed data can be pasted into the range. The passed data can either be specified as a pointer to an IDataObject or, if the pointer is NULL, the data in the clipboard.

ITextRange::ChangeCase
STDMETHODIMP ITextRange::ChangeCase(long Type)

The method sets the capitalization of the text within the range. The passed flag indicates whether the first word in each sentence should be capitalized, whether all the text should be set to lower or upper case, etc.

ITextRange::Collapse
STDMETHODIMP ITextRange::Collapse(long bStart)

This method sets the range to an insertion point either at the start character position or the limit character position as indicated by the passed flag.

ITextRange::Copy
STDMETHODIMP ITextRange::Copy(IUnknown ** ppIDataObject)

This method copies the characters of the range into the passed data object.

ITextRange::Cut
STDMETHODIMP ITextRange::Cut(IUnknown ** ppIDataObject)

The method is analogous to the method ITextRange::Copy, except that the text described by the range is deleted after the text is copied.

ITextRange::Delete
STDMETHODIMP ITextRange::Delete(long Unit, long Count, long * pdelta)

This method deletes all or a portion of the text in the range. The passed unit can indicate a character, word, or the entire range. If the passed unit indicates the entire range, then this method deletes all the text in the range. If the range is not empty, then the range is deleted and the number of units indicated by the absolute value of passed count less 1 are deleted. If the passed count is greater than zero, then units at the higher character positions are deleted. If the passed count is less than zero, then units at the lower character positions are deleted.

ITextRange::EndOf
STDMETHODIMP ITextRange::EndOf(long Unit, long Extend, long * pDelta)

This method moves the limit character position to the end of the first unit of the passed type that overlaps the limit character position. If the passed extend flag is true, then only the limit character position is moved. Otherwise, the range is set to an insertion point after the overlapping unit. This method returns the number of characters by which the limit character position is moved.

ITextRange::Expand
STDMETHODIMP ITextRange::Expand(long Unit, long * pDelta)

This method expands the range so that any partial units of the passed type contained within it are completely contained. If the range is an insertion point, the range is expanded to include the unit. This method returns the number of characters added to the range.

ITextRange::FindText
STDMETHODIMP ITextRange::FindText(BSTR bstr, long Count, long Flags, long * pLength)

This method searches up to the passed count characters in the range for text matching the passed string. The method searches to up the number of characters that is equal to the absolute value of the passed count. If the passed count is greater than zero, then the method starts searching from the start character position, else the method starts from the end character position. If matching text is found, then the method sets the range to describe the matching text only, and returns the length of the found text. If the matching text is not found, this method does not modify the range and returns a length of zero. The passed flag controls the type of matching (e.g., case sensitive).

ITextRange::FindTextEnd
STDMETHODIMP ITextRange::FindFromEnd(BSTR bstr, long Count, long Flags, long * pDelta)

This method is analogous to ITextRange::FindText, except that the method starts the search at the limit character position and searches in the direction indicated by the sign of the count. The method moves the limit character position to the end of the matching string and does not move the start character position.

ITextRange::FindTextStart
STDMETHODIMP ITextRange::FindFromStart(BSTR bstr, long Count, long Flags, long * pDelta)

This method is analogous to ITextRange::FindTextEnd, except that the start character of the range is moved to match the start of the matching text.

ITextRange::GetChar
STDMETHODIMP ITextRange::GetChar(long * pChar)

This method returns the first character in the range.

ITextRange::GetDuplicate
STDMETHODIMP ITextRange::Get(ITextRange ** ppRange)

This method creates a range object that has a range that is equal to the range of this range object and returns a pointer to its ITextRange interface.

ITextRane::GetEnd
STDMETHODIMP ITextRange::GetEnd(long * pcpLim)

This method returns the limit character position of this range.

ITextRange::GetFont
STDMETHODIMP ITextRange::GetFont(ITextFont ** ppFont)

This method returns a pointer to a font object that describes the font attributes for the characters in the range of this range.

ITextRange::GetFormattedText
STDMETHODIMP ITextRange::GetFormattedText (ITextRange ** ppRange)

This method is analogous to the method of ITextRange::GetDuplicate.

ITextRange::GetIndex
STDMETHODIMP ITextRange::GetIndex(long Unit, long * pindex)

This method returns the index of first unit of the passed type in the range. The units are indexed from the start of the story.

ITextRange::GetPara
STDMETHODIMP ITextRange::GetPara(ITextPara ** ppPara)

This method creates a paragraph object that describes the paragraph attributes of this range, and returns a pointer to the ITextPara interface for the object.

ITextRange::GetPoint
STDMETHODIMP ITextRange::GetStart(long * px, long * py, long Type)

This method returns the screen coordinates for either the start or the limit characters of this range. The passed flag also indicates whether the top or bottom edge of the bounding rectangle should be returned.

ITextRange::GetStart
STDMETHODIMP ITextRange::GetStart(long * pcpFirst)

This method returns the start character position of this range.

ITextRange::GetStoryLength
STDMETHODIMP ITextRange::GetStoryLength(long * pCount)

This method returns the number of characters in the story on which this range is defined.

ITextRange::GetStoryType
STDMETHODIMP ITextRange::GetStoryLength(long * pValue)

This method returns the type of the story on which this range is defined. Story types include unknown, main text, footnotes, endnotes, comments, headers, footers, textbox, and so on.

ITextRange::GetText
STDMETHODIMP ITextRange::GetText(BSTR * pbstr)

This method returns a string containing the text in this range.

ITextRange::InRange
STDMETHODIMP ITextRange::InRange(ITextRange * pRange, long * pb)

This method returns a flag indicating whether the text range described by the passed range object is fully contained within this range.

ITextRange::InStory
STDMETHODIMP ITextRange::InStory(ITextRange * pRange, long * pb)

This method returns a flag indicating whether the passed range is within the same story as this range.

ITextRange::IsEgual
STDMETHODIMP ITextRange::IsEqual(ITextRange * pRange, long * pb)

This method returns a flag indicating whether the passed range is within the range.

ITextRange::Move
STDMETHODIMP ITextRange::Move(long Unit, long Count, long * pDelta)

This method sets the range to an insertion point at the start or limit character position depending on the sign of the passed count. The method then moves the insertion point the number of units of the passed type indicated by the absolute value of the passed count in the direction indicated by the sign of the passed count. The method returns the number of units by which the insertion point was moved.

ITextRange::MoveEnd
STDMETHODIMP ITextRange::MoveEnd(long Unit, long Count, long * pDelta)

This method moves the limit character position of the range the passed count of units of the passed type. The method returns the count of the number of units moved.

ITextRange::MoveEndUntil
STDMETHODIMP ITextRange::MoveEndUntil(VARIANT * Cset, long Count, long * pDelta)

This method moves the limit character position past the next set of contiguous characters that are not found in the passed set characters or past the passed count number of characters, which ever is shorter. The method returns the number of characters by which the limit character position is moved.

ITextRange::MoveEndWhile
STDMETHODIMP ITextRange::MoveEndWhile (VARIANT * Cset, long Count, long * pDelta)

This method is analogous to the method ITextRange::MoveEndUntil, except that the characters passed are found in two ranges.

ITextRange::MoveStart
STDMETHODIMP ITextRange::MoveStart(long Unit, long Count, long * pDelta)

This method is analogous to the method ITextRange::MoveEnd, except that the start character position, rather than the limit character position, of the range is moved.

ITextRange::MoveStartUntil
STDMETHODIMP ITextRange::MoveStartUntil (VARIANT * Cset, long Count, long * pDelta)

This method is analogous to the method ITextRange::MoveEndUntil, except that the start character position, rather than the limit character position, of the range is moved.

ITextRange::MoveStartWhile
STDMETHODIMP ITextRange::MoveStartWhile (VARIANT * Cset, long Count, long * pDelta)

This method is analogous to the method ITextRange::MoveEndWhile, except that the starting character position, rather than the limit character position, of the range is moved.

ITextRange::MoveUntil
STDMETHODIMP ITextRange::MoveUntil(VARIANT * Cset, long Count, long * pDelta)

This method is analogous to the method ITextRange::Move, except that the insertion point is moved no further than any character in the passed set.

ITextRange::MoveWhile
STDMETHODIMP ITextRange::MoveWhile(VARIANT * Cset, long Count, long * pDelta)

This method is analogous to the method ITextRange::MoveUntil, except that the characters past are found in the passed set.

ITextRange::Paste
STDMETHODIMP ITextRange::Paste(IUnknown * pIDataObject)

This method pastes the data of the passed data object into this range.

ITextRange::ScrollIntoView
STDMETHODIMP ITextRange::ScrollIntoView(long Code)

This method scrolls this range into view according to the passed indication of scroll to top, bottom, left or right.

ITextRange::Select
STDMETHODIMP ITextRange::Select(ITextSelection * pSel)

This method sets the active selection to the text of this range.

ITextRange::SetChar
STDMETHODIMP ITextRange::SetChar(long Char)

This method sets the first character within this range to the passed character.

ITextRange::SetEnd
STDMETHODIMP ITextRange::SetEnd(long cp)

This method sets the limit character position of this range to the passed value. If the new limit character position precedes the start character position, then the start and limit character positions are interchanged.

ITextRange::SetFont
STDMETHODIMP ITextRange::SetFont(ITextFont * pfont)

This method sets the font of the characters in this range according to the font attributes specified in the passed font.

ITextRange::SetFormattedText
STDMETHODIMP ITextRange::SetFormattedText (ITextRange * pRange)

This method replaces the text and attributes of the range with the text and attributes of the passed range.

ITextRange::SetIndex
STDMETHODIMP ITextRange::SetIndex(long Unit, long Index, long Extend)

This method sets this range, depending on the passed flag, either to an insertion point start at or to a range encompassing the passed unit of the passed index.

ITextRange::SetPara
STDMETHODIMP ITextRange::SetPara(ITextPara * pPara)

This method sets the paragraph attributes of this range to those of the passed paragraph object.

ITextRange::SetPoint
STDMETHODIMP ITextRange::SetPoint(long x, long y, long Extend)

This method, depending on the passed flag, either extends this range to or sets this range to an insertion point at the character corresponding to the passed screen coordinates.

ITextRange::SetRange
STDMETHODIMP ITextRange::SetRange(long cpFirst, long cpLim)

This method sets the start character position and the limit character position of this range to the passed values.

ITextRange::SetStart
STDMETHODIMP ITextRange::SetStart(long cp)

This method sets the start character position of the current range to the passed value.

ITextRange::SetText
STDMETHODIMP ITextRange::SetText(BSTR bstr)

This method replaces the text of this range with the passed text.

ITextRange::StartOf
STDMETHODIMP ITextRange::StartOf(long Unit, long Extend, long * pDelta)

This method, depending on the passed flag, either moves the start character position to or sets an insertion point at the beginning of the first unit of the passed type that overlap this range. The method returns the number of characters by which the start character position is moved.

ITextSelection

A text selection object is a special type of range object. The text selection conceptually corresponds to characters that are displayed on the screen and that are currently selected. The text selection object has an active end and selection highlighting, as well as extra UI-oriented methods that allow for keyboard input emulation. The active end is either the start character position or the limit character position, whichever was last moved. An example of active end processing occurs when, in Microsoft Word, the Shift key is held down while arrow keys on the keypad are used to move the cursor. The effect is to expand or contract the selected text as the cursor is moved. Below is a definition of the ITextSelection interface.

```
Class ITextSelection:ITextRange
{
  STDMETHODIMP Down(long Unit, long Count, long Extend, long * pDelta) = 0
  STDMETHODIMP EndKey(long Unit, long Extend, long * pDelta) = 0
  STDMETHODIMP GetFlags(long * pFlags) = 0
  STDMETHODIMP GetType(LONG * pType) = 0
  STDMETHODIMP HomeKey(long Unit, long Extend, long * pDelta) = 0
  STDMETHODIMP Left(long Unit, long Count, long Extend, long * pDelta) = 0
  STDMETHODIMP Right(long Unit, long Count, long Extend, long * pDelta) = 0
  STDMETHODIMP SetFlags(long Flags) = 0
  STDMETHODIMP TypeText(BSTR bstr) = 0
  STDMETHODIMP Up(long Unit, long Count, long Extend, long * pDelta) = 0
}
```

ITextSelection::Down
STDMETHODIMP Down(long Unit, long Count, long Extend, long * pDelta)

This method provides the functionality commonly associated with the down arrow key. The limit character position is moved the passed count of the passed units (e.g., lines, paragraph, windows, or the entire text). If the range is not to be extended, then an insertion point is set at the limit character position. This method returns the actual number of units moved.

ITextSelection::EndKey
STDMETHODIMP EndKey(long Unit, long Extend, long * pDelta)

This method provides the functionality commonly associated with the end key. This method moves the active end to the end of the line or story as designated by the passed unit type. If the range is not to be extended, then an insertion point is set at the position of the moved active end. The method returns the number of characters moved.

ITextSelection::GetFlags
STDMETHODIMP GetFlags(long * pFlags)

This method returns the current setting of the selection flags. The flags are powers of 2, and can therefore be added together to set bits within the long word. The selection flags indicate (1) which end is active, (2) whether a caret corresponding to an insertion point at the end of a line is displayed at the end of the line or beginning of the next line, (3) whether the mode is insert or overtype, (4) whether the selection is active, and (5) whether typing or pasting replaces the selection.

ITextSelection::GetType
STDMETHODIMP GetType(LONG * pType)

This method returns the type of the current selection. The types include (1) no selection, (2) insertion point, (3) single nondegenerate range, (4) embedded object, (5) embedded picture, etc.

ITextSelection::HomeKey
STDMETHODIMP HomeKey(long Unit, long Extend, long * pDelta)

This method provides the functionality commonly associated with the home key. This method is analogous to the method ITextSelection::EndKey, except that the active end is moved to the start of the current line or story.

ITextSelection::Left
STDMETHODIMP Left(long Unit, long Count, long Extend, long * pDelta)

This method provides the functionality commonly associated with the left arrow key. The active end is moved to the left by the number of character or word units indicated by the passed count. If the range is not to be extended, then an insertion point is set at the moved active end. The method returns the number of units moved.

ITextSelection::Right
STDMETHODIMP Right(long Unit, long Count, long Extend, long * pDelta)

This method provides the functionality commonly associated with the right arrow key. It is analogous to the method ITextSelection::Left.

ITextSelection::SetFlags
STDMETHODIMP SetFlags(long Flags)

This method sets the current selection flags to the passed flags.

ITextSelection::TypeText
STDMETHODIMP TypeText(BSTR bstr)

This method adds the passed character string to the selection as if the character string was typed by a user.

ITextSelection::Up
STDMETHODIMP Up(long Unit, long Count, long Extend, long * pDelta)

This method provides the functionality commonly associated with up arrow key. This method is analogous to the method ITextSelection::Down.

ITextStoryRanges Interface

The ITextStoryRanges interface of a document object provides the functionality to enumerate the stories of the document. An ITextStoryRanges object is obtained by the ITextDocument::GetStoryRanges() method. Below is a definition of the ITextStoryRanges interface.

```
class ITextStoryRanges:IDispatch
{
  STDMETHODIMP NewEnum(IEnumRange ** ppRange) = 0
  STDMETHODIMP GetCount(long * pCount) = 0
  STDMETHODIMP Item(Long Index, ITextRange ** ppRange)
}
```

ITextStoryRanges::NewEnum
STDMETHODIMP NewEnum(IEnumRange **ppRange)

This method returns an enumerator interface for the current stories in the document.

ITextStoryRanges::GetCount
STDMETHODIMP GetCount(long * pCount)

This method returns a count of the number of stories in this document.

ITextStoryRanges::Item
STDMETHODIMP Item(LONG Index, ITextRange ** ppRange)

This method creates a range object and returns a pointer to the ITextRange interface.

ITextFont

The ITextFont interface provides various methods for accessing the attributes of the characters in a range. The attributes include capitalization, font size, font type, color, etc. A font object is associated with a range object. As the limits of the range are adjusted, the attribute of the range change accordingly. The ITextFont interface has two methods for each attribute: a get attribute method and a set attribute method. The get attribute methods are used to retrieve the value of a certain attribute of all the characters in the range. If not all the characters in the range have the same value for that certain attribute, then such an IS indication is returned. The set attribute methods are used to set a certain attribute of all the characters in the range to the same passed value.

Figure 9:
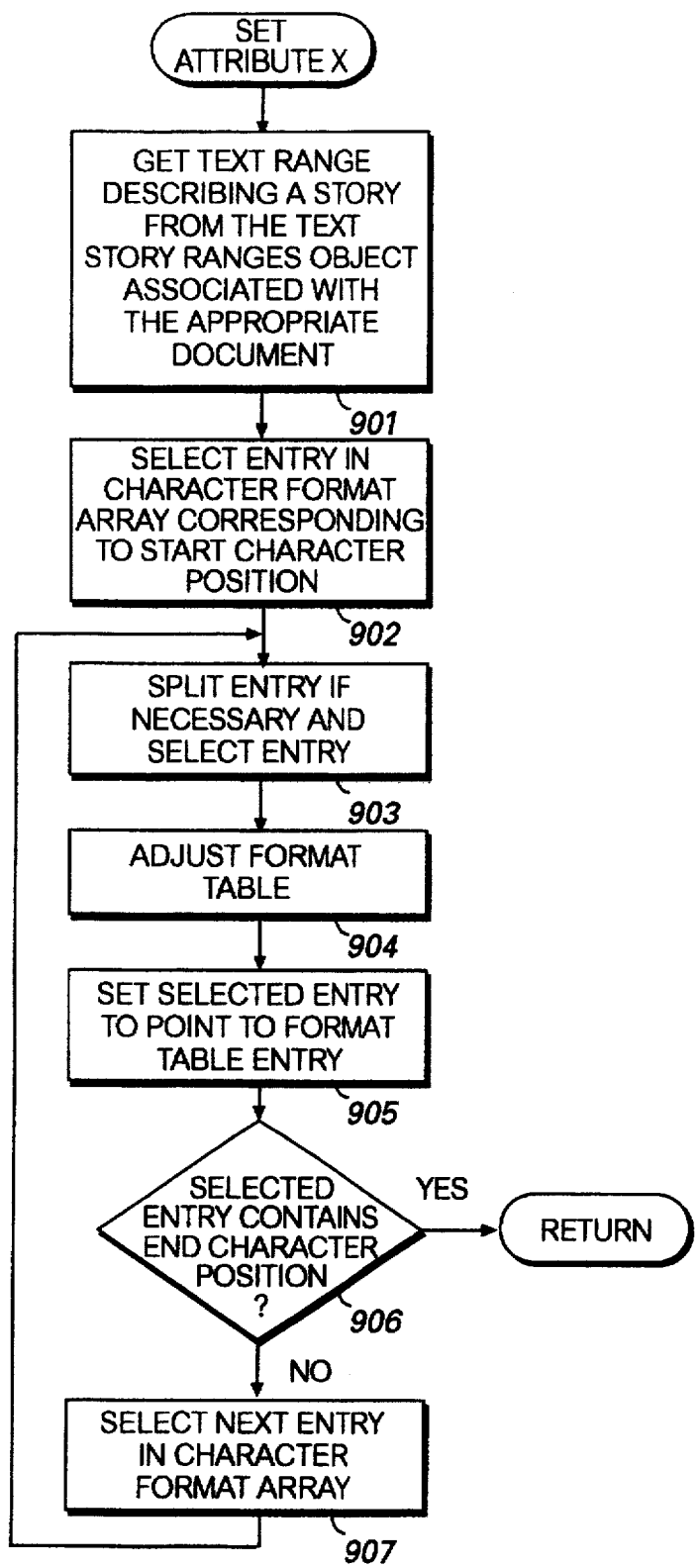
FIG. 9 is a flow diagram of a sample set attribute method.

The set attribute methods update the character format array 303a and the character format table 306 as appropriate. FIG. 9 is a flow diagram of a sample set attribute method. In step 901, the method retrieves a range object describing a particular story within a document. In steps 902–907, the method loops processing each entry in the character format array corresponding to the range. The method may need to split entries corresponding to the start or end of the range. Also, the method preferably combines adjacent entries that because of the change in the attribute value have the same format. The method adjusts the entries of the character format table by adding, deleting, or modifying entries corresponding to formats in the range. In step 902, the method selects the entry in the character format array that corresponds to the start character position. In step 903, the method splits the selected entry as appropriate for the start or end of the range or combines adjacent entries. In step 904, the method adjusts the character format table to add, delete, or modify an entry to ensure that there are no duplicate or unused entries in the format table and that there is an entry that has the appropriate character format, that is, with the passed attribute value. In step 905, the method sets the selected character format array entry to point to the appropriate character format table entry. In step 906, if selected character format array entry corresponds to the limit character position, then the method returns, else the method continues at step 907. In step 907, the method selects the next entry of the character format array and loops to step 903 to process the selected entry.

ITextPara

The ITextPara interface is analogous to the ITextFont interface, except that it provides access to the paragraph, rather than character formatting attributes. The attributes of a paragraph include tabs, line alignment, indentation, and inter-line spacing. The methods of the ITextPara interface access the attributes of the paragraphs that overlap the associate range. The methods manipulate the Paragraph Format array for the story in a manner that is analogous to the methods of the ITextFont interface.

Implementation

Figure 6:
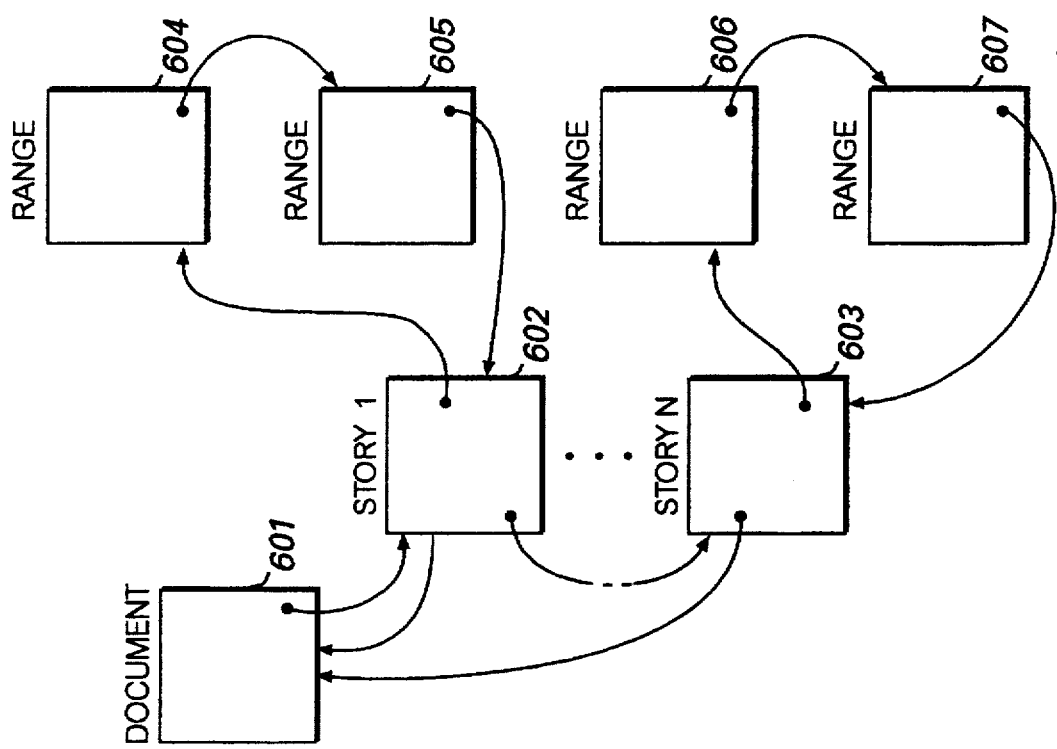
FIG. 6 illustrates sample data structures that are used to track ranges.

FIG. 6 illustrates sample data structures that are used to track ranges. The document object 601 contains a reference to story objects 602 and 603. Each story object contains references to multiple range objects, 604, 605, 606, and 607.

Figure 7:
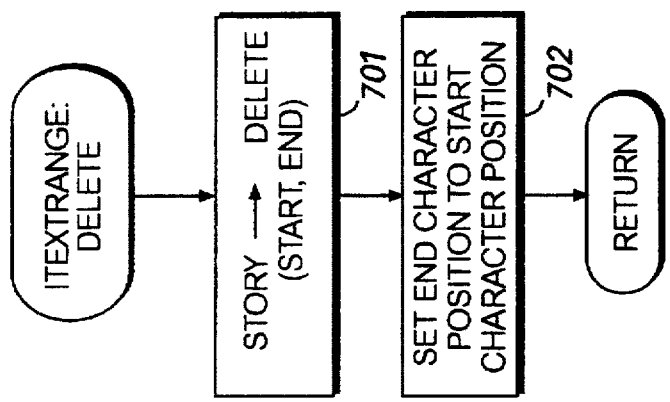
FIG. 7 is a flow diagram illustrating an implementation of the method ITextRange::Delete.

FIG. 7 is a flow diagram illustrating an implementation of the method ITextRange::Delete. The implementation illustrates how multiple ranges are adjusted when the size of one range is altered. This method invokes a method of the associated story object to delete the range of characters indicated by its start and limit character positions. The method then sets its limit character position to its start character position and returns.

Figure 8:
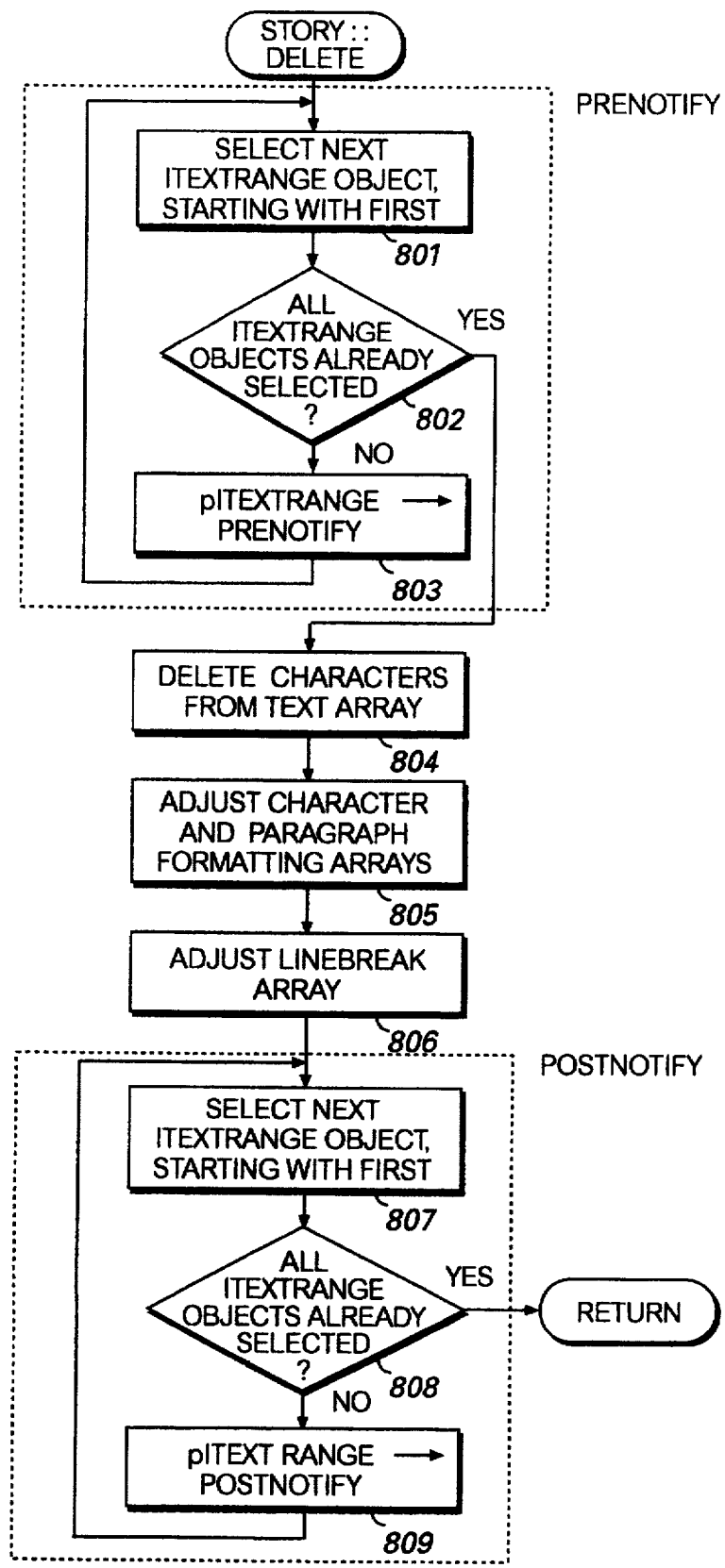
FIG. 8 is a flow diagram illustrating an implementation of the method ITextStoryRange::Delete.

FIG. 8 is a flow diagram illustrating an implementation of the delete method of a story object. The method deletes from the text the characters corresponding to the passed character positions. The method also notifies each range object defined on the story so that its limits can be adjusted. The method notifies the range objects both before and after the characters are deleted. In steps 801–803, the method loops selecting each range object and invoking its method for notification before changing the size of the range. In steps 804–806, the method accesses the text referenced by the text object to delete the characters, to adjust the character and paragraph format objects, and to adjust the line break object. In step 807–809, the method loops selecting each range object and invoking its method for notification after changing the size of the range. The notify methods of the range objects would typically reset their limits.

Hypertext applications, like on-line books and help facilities, database form generators, computer games, and a multitude of other applications can easily incorporate text processing by including the TOM header files and linking to a TOM executable. The displayed text can be displayed and modified through range object methods, giving a common look and feel to all text processing over the range of applications.

Although the present invention has been described in terms of a preferred embodiment, it is not intended that the invention be limited to these embodiments. Modifications within the spirit of the invention will be apparent to those skilled in the art. For example, text may include, in addition to characters, various symbols (e.g., mathematical symbols) and graphic objects. Also, the servers and clients can be computer programs that execute as separate processes, as separate threads within a single process, or within a single thread. One skilled in the art would also appreciate that the server may need to lock out access to a critical section of the server simultaneously by multiple clients or single client with multiple requests. The locking mechanism can be through semaphore or other mutual exclusion mechanism. Because the TOM objects are preferably OLE compliant they can be easily accessed from both event handles and applications. The scope of the present invention is defined by the claims that follow.

We claim:

1. A method in a computer system for processing of data, the data having a plurality of characters, the computer system having a client and a server, comprising:

under control of the client,
sending to the server requests to define a plurality of ranges of the data, each range having a property;

under control of the server,
receiving the request to define the plurality of ranges of data; and
in response to receiving the request to define, associating a range object with each of the plurality of ranges, each range object having a member function for accessing the characters within the associated range;

under control of the client,
sending to the server a request to modify a selected one of the defined ranges in such a way that the property of the selected range is affected; and under control of the server,
receiving the request to modify the selected range; and
in response to receiving the request to modify,
invoking the member function of the range object associated with the selected range, wherein the selected range is modified in accordance with the received request, and wherein, for each of the plurality of defined ranges that is affected by the modification of the selected range, the property of the defined range is adjusted to reflect the affect that the modification of the selected range has on the defined range.

2. The method of claim 1 wherein each of the plurality of characters has a character position and the characters are ordered from a first to a last character position, and wherein the property of each of the defined ranges is a start character position and limit character position that identify the characters within the range, wherein the modification to the selected range changes the number of characters within the range, and wherein adjusting of the defined ranges includes changing the start character position and limit character position of the defined ranges to adjust for a change in the number of characters in the selected range.

3. The method of claim 1 where each of the plurality of characters in the selected range has a format, wherein the request to modify is a request to modify the format of a character, and wherein the format of the character in the selected range is modified.

4. The method of claim 3 wherein a defined range includes the character whose format is modified, the step of adjusting ensures that the modification is reflected in the defined range.

5. The method of claim 1 wherein the client and server execute in separate processes.

6. The method of claim 1 wherein the client and server execute as separate threads of a single process.

7. The method of claim 1 wherein the client and server execute within a single thread.

8. The method of claim 1 wherein the client includes a plurality of clients where each of the clients sent a request to define.

9. The method of claim 7 wherein the server, upon receiving a request from a client to modify, adjusts the property of each range object in accordance with the received request before processing another request.

10. The method of claim 1 wherein each range object includes its own copy of the plurality of characters and wherein a modification to a character in the selected range is reflected in each copy of the plurality of characters.

11. The method of claim 1 where the range objects share a single copy of the plurality of characters.

12. A computer-readable memory device for controlling a computer system to perform the steps of claim 1.

13. A computer system for providing clients with uniform access to text of servers, the text having a plurality of characters, comprising:
within each server,
document object means for receiving an indication of a range of characters of the text and for creating a range object that identifies the indicated range and that provides a member function for accessing the characters in the identified range; and
within each client,
means for sending the indication of the range of characters of the text to a server;
means for receiving an indication of the created range object; and
means for using the received indication of the created range object to invoke the member function to access the characters in the identified range.

14. The computer system of claim 13 wherein the created range object has a function member for re-indicating the range by searching through the text.

15. The computer system of claim 13 wherein the created range object has a function member for retrieving the characters of the range.

16. A method in a computer system for a server to provide uniform access to text of the computer program, the text comprising a plurality of characters, the method comprising:
for each of a plurality of clients,
receiving a request to access the text; and
in response to receiving the request to access the text, assigning a document object having member functions for providing access to the text;
for each of the plurality of clients,
receiving a request to define a selected range of characters within the text; and
in response to receiving the request to define a selected range, invoking a member function of the document object assigned to the client wherein a range object having member functions for manipulating the characters of the selected range is assigned to the client; and
for each of the plurality of clients,
receiving a request to access the selected range of the client; and
in response to receiving the request, invoking a member function of the range object assigned to the client.

17. The method of claim 16 wherein the member functions of the document object provide functionality to define a range of characters by instantiating a range object.

18. The method of claim 16 wherein the member functions of the range object provide functionality to manipulate the format of each character within the range.

19. The method of claim 16 wherein the member functions of the range object provide functionality to manipulate the format of paragraphs of characters within the range.

20. The method of claim 16 wherein the member functions of the document object provides functionality to receive a display device coordinate position and return a reference to a range object for a range that is near the display device coordinate position.

21. The method of claim 16 wherein the member functions of the range object provide functionality to re-define the range by searching through the text.

22. A method in a computer system for a first computer program to determine text displayed on a display device by a second computer program, comprising:
under control of a first computer program, displaying the text on a display device;
under control of the second computer program, sending a request to the first computer program to access text displayed at a certain position of the display device;
under control of the first computer program,
receiving the request; and
in response to receiving the request,
determining a range of characters corresponding to the certain position of the display device; and
instantiating an range object for processing the range, the range object having a predefined interface with a member function for accessing the determined range of characters;
under control of the second computer program, sending a request to the first computer program to retrieve the characters of the defined range; and
under control of the first computer program,
receiving the request;
in response to receiving the request,
invoking the member function to retrieve the characters; and
sending the retrieved characters to the second computer program.

23. The method of claim 22 wherein the second computer program upon receiving the retrieved characters announces the characters.

* * * * *